US 12,308,184 B2

(12) United States Patent
Yoo et al.

(10) Patent No.: US 12,308,184 B2
(45) Date of Patent: May 20, 2025

(54) IN-VEHICLE OPERATION BUTTON INSTALLATION STRUCTURE

(71) Applicants: Hyundai Transys Inc., Seosan-si (KR); Yong Jun Hwang, Yongin-si (KR)

(72) Inventors: Jonhoun Yoo, Hwaseong-si (KR); Yun Seo Kang, Cheonan-si (KR); Semin Kim, Hwaseong-si (KR); Yong Rak Kim, Hwaseong-si (KR); Seung Young Lee, Hwaseong-si (KR); Yong Jun Hwang, Yongin-si (KR)

(73) Assignees: Hyundai Transys Inc., Seosan-si (KR); Yong Jun Hwang, Yongin-si (KR)

( * ) Notice: Subject to any disclaimer, the term of this patent is extended or adjusted under 35 U.S.C. 154(b) by 0 days.

(21) Appl. No.: 17/964,607

(22) Filed: Oct. 12, 2022

(65) Prior Publication Data

US 2023/0187149 A1    Jun. 15, 2023

(30) Foreign Application Priority Data

Dec. 15, 2021    (KR) .......................... 10-2021-0180118

(51) Int. Cl.
*H01H 13/14*    (2006.01)
*B60N 2/02*    (2006.01)
(Continued)

(52) U.S. Cl.
CPC ........... *H01H 13/14* (2013.01); *B60N 2/0228* (2013.01); *B60N 2/90* (2018.02); *H01H 13/20* (2013.01); *H01H 13/70* (2013.01)

(58) Field of Classification Search
CPC ........ H01H 13/14; H01H 13/20; H01H 13/70; B60N 2/90; B60N 2/58; B60N 2/02;
(Continued)

(56) References Cited

U.S. PATENT DOCUMENTS 8,400,263 B2 *    3/2013    Lickfelt ................... G05G 1/02
                                                            200/333
8,575,506 B2 *    11/2013    Kitahara ................ H01H 13/06
                                                            200/341
(Continued)

FOREIGN PATENT DOCUMENTS

DE    10 2019 112886 A1    11/2020
WO    2021/144285 A1    7/2021

OTHER PUBLICATIONS

Christoph Erbel, "European Search Report for EP Application No. 22200527.4", Jul. 14, 2023, EPO, Munich, Germany.

*Primary Examiner* — Lheiren Mae A Caroc
(74) *Attorney, Agent, or Firm* — Bridgeway IP Law Group, PLLC; Jihun Kim (57) ABSTRACT

A structure for installing an operation button in a vehicle seat includes: a surface material covering the vehicle seat, wherein a button operation unit is formed on a portion of the surface material by deforming a shape of the portion of the surface material; and an operation button assembly attached to a back surface of the surface material and including the operation button corresponding to the button operation unit, wherein the button operation unit includes a button display unit configured for displaying a function of the button operation unit and formed on an outer side of the button operation unit on the portion of the surface material.

14 Claims, 11 Drawing Sheets

(51) Int. Cl.
*B60N 2/90* (2018.01)
*H01H 13/20* (2006.01)
*H01H 13/70* (2006.01)

(58) Field of Classification Search
CPC ........ B60K 2370/128; B60K 2370/139; B60K 2370/42; B60K 2370/46; B60K 2370/682; B60K 2370/688; B60K 2370/744; B60K 2370/794; B60K 37/06
USPC .......................................... 200/341, 520, 333
See application file for complete search history.

(56) References Cited

U.S. PATENT DOCUMENTS

| | | | |
|---|---|---|---|
| 8,866,032 B2* | 10/2014 | Giordano | B66D 1/46 |
| | | | 200/333 |
| 10,604,039 B2* | 3/2020 | Drbohlav | B60N 2/5891 |
| 2006/0049030 A1* | 3/2006 | Grems | B60N 2/797 |
| | | | 200/333 |
| 2019/0275930 A1 | 9/2019 | Cho et al. | |
| 2021/0107400 A1 | 4/2021 | Erler et al. | |

* cited by examiner

IN-VEHICLE OPERATION BUTTON INSTALLATION STRUCTURE

CROSS-REFERENCE TO RELATED APPLICATIONS

This application claims priority to and the benefit of Korean Patent Application No. 10-2021-0180118 filed in the Korean Intellectual Property Office on Dec. 15, 2021, the entire contents of which are incorporated herein by reference.

TECHNICAL FIELD

The present invention relates to an in-vehicle operation button installation structure, and more particularly, to an in-vehicle operation button installation structure in a vehicle seat or a door trim for operating an internal device (for example, the vehicle seat) inside a vehicle.

BACKGROUND ART

When the number of electronic devices and electric devices mounted on a vehicle increases, a plurality of operation buttons is provided inside the vehicle. In general, operation buttons in a vehicle interior are mainly disposed around a steering wheel, a dashboard, a center fascia, and a center console.

The operation button disposed on the door trim side includes a window opening/closing button, a door lock button, and the like, and an operation button for electric operation of the vehicle seat is also disposed on the door trim side. In addition, the vehicle seat may also be provided with an operation button for operating the posture of the seat.

Figure 1A:
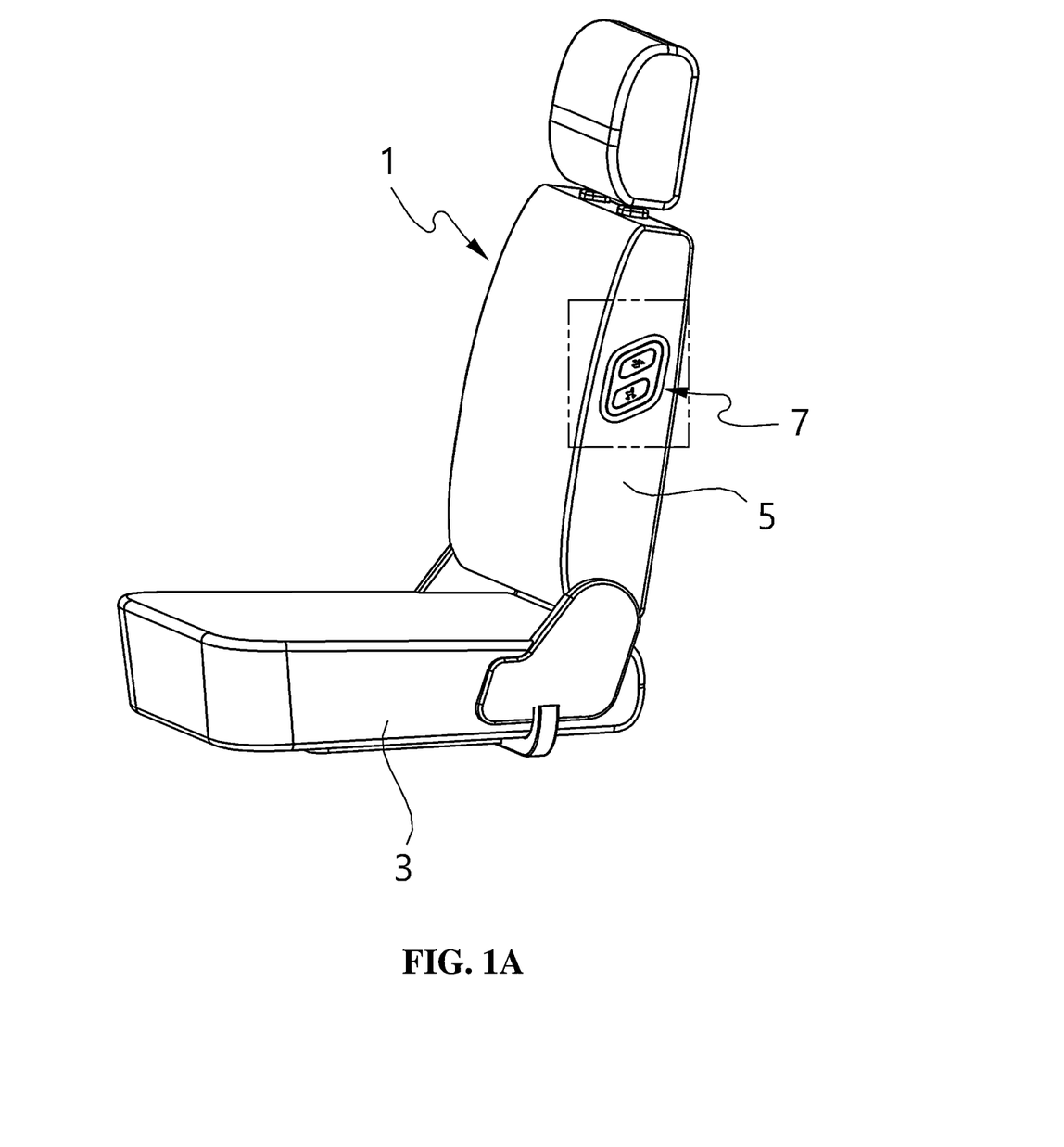
FIG. 1A is a diagram illustrating an example of an operation button provided on a vehicle seat.
Figure 1B:
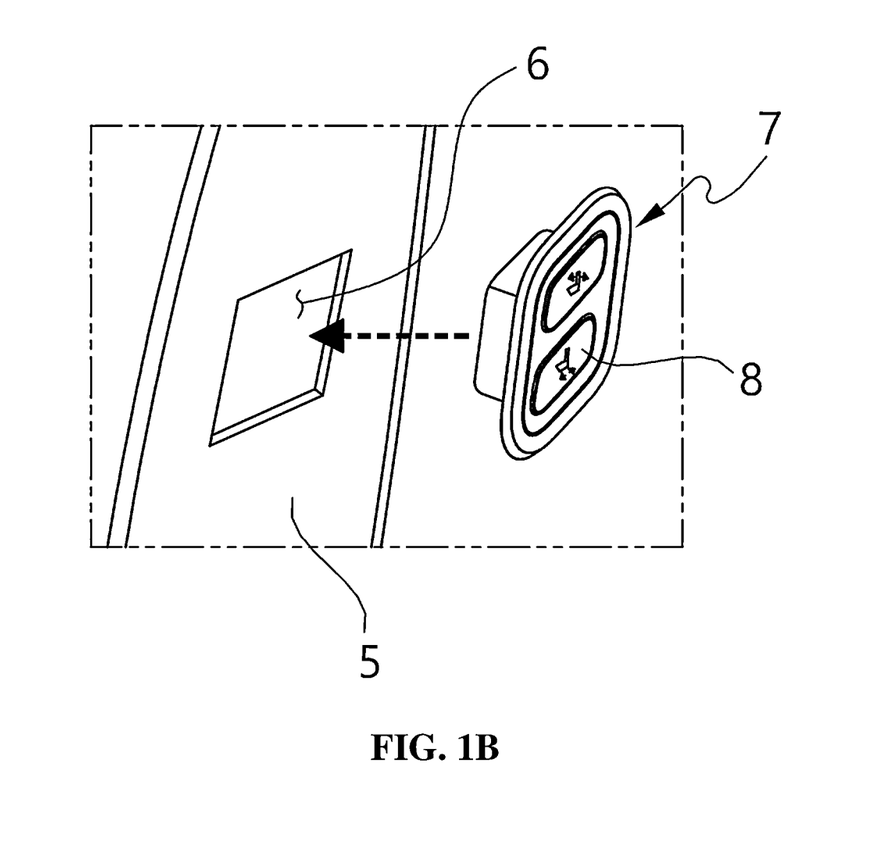
FIG. 1B is an expanded view of a surface portion of the vehicle seat defined by a dash line into which an operation button assembly is installed.

FIG. 1A is a diagram illustrating an example of an operation button provided on a vehicle seat. FIG. 1B is an expanded view of a surface portion of the vehicle seat defined by a dash line into which an operation button assembly is installed.

A vehicle seat 1 of FIGS. 1A and 1B exemplifies the passenger seat of the vehicle. The vehicle seat 1 includes a seat cushion 3 and a backrest 5. In some cases, an operation button assembly 7 also called a so-called walk-in switch is provided on the side surface of the backrest 5. The operation button assembly 7 is provided with a button 8 that allows the driver to adjust the angle of the backrest 5 of the passenger seat and slide the passenger seat.

Typically, the vehicle seat 1 is covered with a surface material made of natural leather, artificial leather, or fabric. As illustrated in FIGS. 1A and 1B, a predetermined portion of the surface material is cut to form an installation opening 6, and the operation button assembly 7 is inserted into the installation opening 6 and coupled thereto. As a method of assembling the operation button assembly 7, a method of fixing the operation button assembly 7 to the internal structure of the vehicle seat 1 may be used. In some cases, the operation button assembly 7 may be installed on the vehicle seat 1 in a form in which a bezel part, which is a cover exposed to the outside, and a back board positioned inside the surface material are coupled.

However, in the operation button, such as the walk-in switch, illustrated in FIGS. 1A and 1B, there was a problem in which the installation positions of the installation opening 6 formed in the surface material and the operation button assembly 7 are misaligned, or the operation button assembly 7 is not in close contact with the outer surface of the surface material. In addition, since the process of covering the surface material, such as natural leather, on the outside of the frame and the cushioning material constituting the vehicle seat 1 and assembling the operation button assembly 7 in place is involved, there is a problem in that the work process is complicated and the work time of the operator is increased.

On the other hand, US Patent Publication No. 2021/0107400 discloses a user interface for operating a vehicle seat installed on the door trim side of the vehicle interior, and discloses the configuration in which a hole is formed in a surface material, such as leather, and a switch is directly exposed to the outside of the hole. Even in this related art for the switch configuration installed on a door trim, misalignment of the installation position and complexity of the installation process still exist.

SUMMARY OF THE INVENTION

The present invention has been made in an effort to provide an in-vehicle operation button installation structure, which allows a user to check a position of an operation button while maintaining the texture of a surface material and makes it possible to easily provide the operation button, without cutting the surface material of a vehicle seat or a door trim or forming a hole in the surface material.

An exemplary embodiment of the present invention provides a structure for installing an operation button, the structure including: a surface material in which a button operation unit is formed on a portion; and; an operation button assembly attached to a back surface of the surface material and including a button corresponding to the button operation unit.

The button operation unit may be molded to protrude to the outside of the surface material.

The button operation unit may be molded by heating and pressurizing.

On the surface material, a button display unit for displaying a function of the button operation unit may be formed on one side of the button operation unit.

The button display unit may be formed by any one of printing, laser engraving, engraving, and embossing.

The surface material may include an outer material of natural leather, artificial leather, or synthetic resin, and an inner material as a cushioning material formed on an inner surface of the outer material.

The operation button assembly may include: a cover part formed with a button corresponding to the button operation unit; a housing to which the cover part is coupled; and a control board provided between the housing and the cover part and formed with a switching terminal that is in contact with the button.

The button may protrude.

The cover part may be formed of silicone or synthetic rubber.

The cover part may have a coupling protrusion formed to protrude, and the coupling protrusion may be coupled to an installation recess formed in the housing, so that the cover part is coupled to the housing.

An installation surface may be formed around an end of the housing, and the installation surface may be coupled to the inner surface of the surface material.

The installation surface may be coupled to the inner surface of the surface material by at least one of an adhesive, thermal fusion, and ultrasonic fusion.

A connector connection opening through which a cable connected to a connector of the control board passes may be formed in the housing.

The structure for installing the operation button according to the present invention may be provided inside a vehicle.

The structure for installing the operation button may be provided on a vehicle seat, and the surface material covers the vehicle seat.

Another exemplary embodiment of the present invention provides a vehicle seat provided with the structure for installing the operation button, the structure including: a surface material in which a button operation unit is formed on a portion; and an operation button assembly attached to a back surface of the surface material and including a button corresponding to the button operation unit.

According to the present invention, it is possible to remarkably reduce the inconvenience or the occurrence of defects in the operation of providing the operation button assembly in the vehicle interior like the vehicle seat as in the related art.

According to the present invention, since only the surface material is exposed to the outside, the texture of the surface material may be transmitted as it is, and the aesthetics and luxury of a vehicle interior structure, such as a vehicle seat, may be improved.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, it should be noted that in giving reference numerals to elements of each drawing, like reference numerals refer to like elements even though like elements are illustrated in different drawings. Further, in the following description of the present invention, a detailed description of known configurations or functions incorporated herein will be omitted when it is judged that the detailed description may make the subject matter of the present disclosure unclear. It should be understood that although the exemplary embodiment of the present invention is described hereafter, the spirit of the present invention is not limited thereto and the present invention may be changed and modified in various ways by those skilled in the art.

Figure 2A:
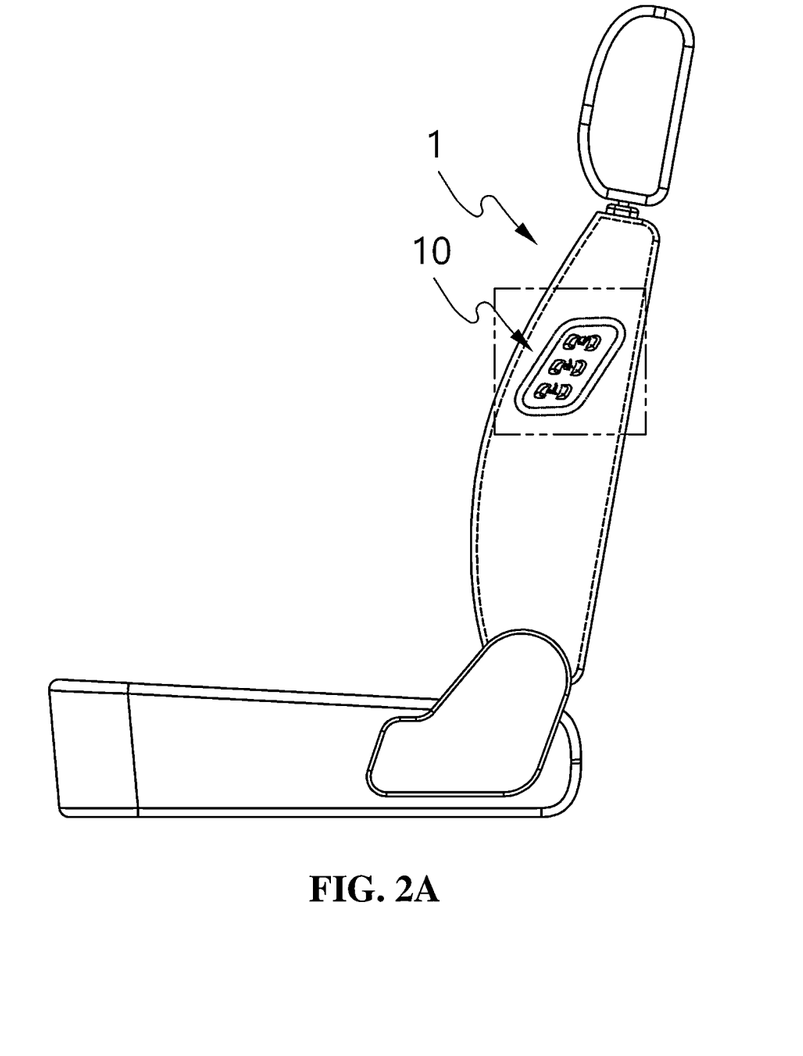
FIG. 2A is a diagram illustrating the case where an operation button installation structure according to an exemplary embodiment of the present invention is applied to a vehicle seat.
Figure 2B:
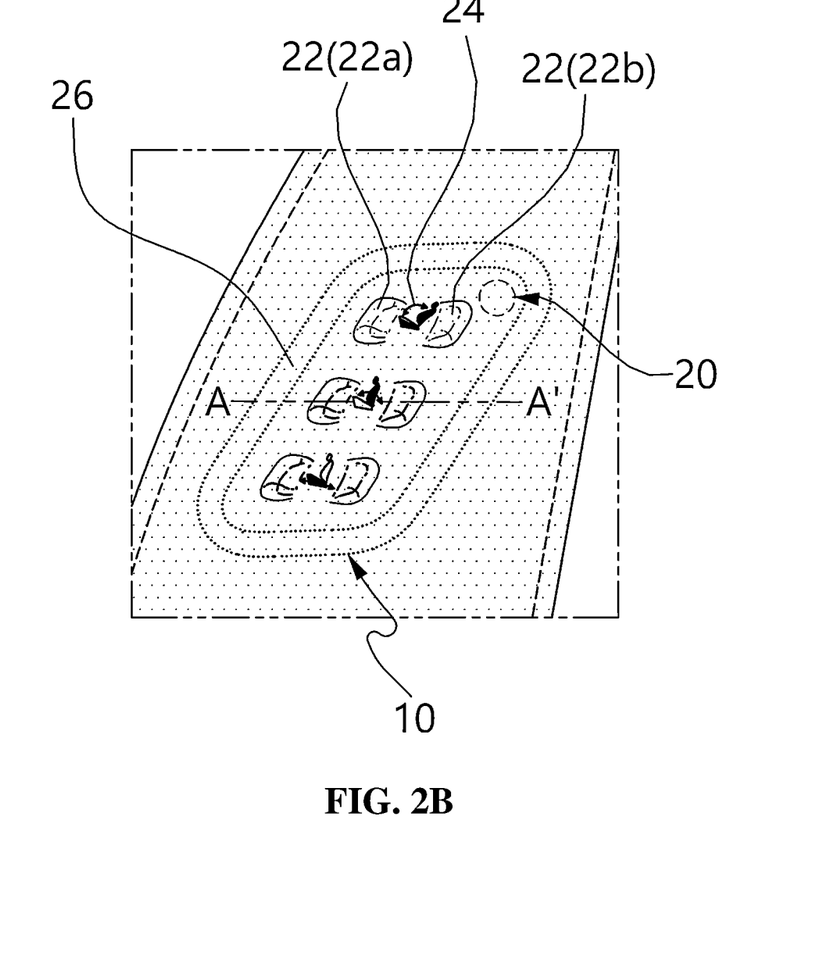
FIG. 2B is an expanded view of a surface portion of the vehicle seat defined by a dash line on which a button operation unit is formed.

FIG. 2A is a diagram illustrating the case where an operation button installation structure according to an exemplary embodiment of the present invention is applied to a vehicle seat. FIG. 2B is an expanded view of a surface portion of the vehicle seat defined by a dash line on which a button operation unit is formed.

An operation button installation structure 10 according to the present invention is provided in a vehicle interior, and is characterized in that a surface material 20 functions as a button operation unit. The surface material 20 may be natural leather, artificial leather, synthetic resin, or the like, and may be a material having predetermined elasticity. The surface material 20 may be a material whose shape is deformed by external pressure. This surface material 20 is to cover a vehicle seat 1 as illustrated in FIGS. 2A and 2B, and in addition to the vehicle seat 1, the vehicle dashboard or the door trim may be covered with the surface material 20 and be formed with the operation button installation structure 10 according to the present invention. In the exemplary embodiment of FIGS. 2A and 2B targeting the vehicle seat 1, a walk-in switch is exemplified as the operation button installation structure 10, but the present invention is not applied only to the walk-in switch as a matter of course.

Referring to FIGS. 2A and 2B, a part of the surface material 20 functions as an operation unit for operating the operation button. To this end, a button operation unit 22 is formed on the surface material 20. The button operation unit 22 may be generated by deforming the shape of the surface material 20. The button operation unit 22 may be pressed by pressing from the outside, and when the pressing force is removed, the button operation unit 22 may be restored to its original shape. In the exemplary embodiment, the button operation unit 22 may be formed to protrude outward. The button operation unit 22 may be provided as a pair, such as a first button operation unit 22a and a second button operation unit 22b, and a plurality of pairs of these button operation units 22 may be provided.

The surface material 20 may be provided with a button display unit 24, such as a character, figure, or symbol, for indicating the function of the button operation unit 22. The button display unit 24 may be formed on the surface of the surface material 20 in a manner, such as printing, laser engraving, engraving, or embossing.

In the example of FIGS. 2A and 2B, a button for folding the backrest, a button for adjusting the angle of the backrest, and a button for sliding the seat 1 are sequentially displayed from top to bottom.

On the other hand, reference numeral 26 illustrated in FIGS. 2A and 2B illustrates an assembly attachment part formed while attaching the operation button assembly 30 described below, and in carrying out the present invention, the assembly attachment part 26 may be formed to be visible from the outside or to be invisible.

Figure 3:
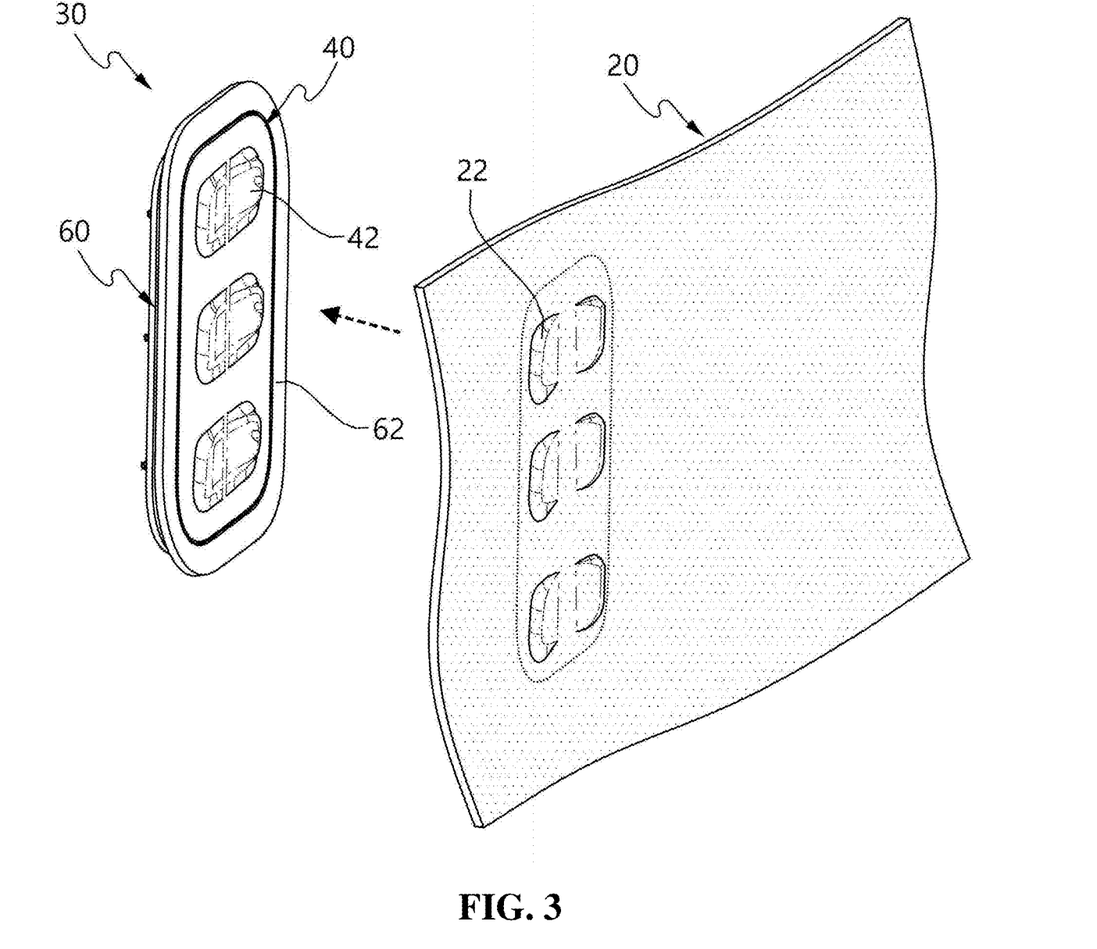
FIG. 3 is a diagram illustrating the separation state of a surface material and an operation button assembly in the operation button installation structure according to the exemplary embodiment of the present invention.
Figure 4:
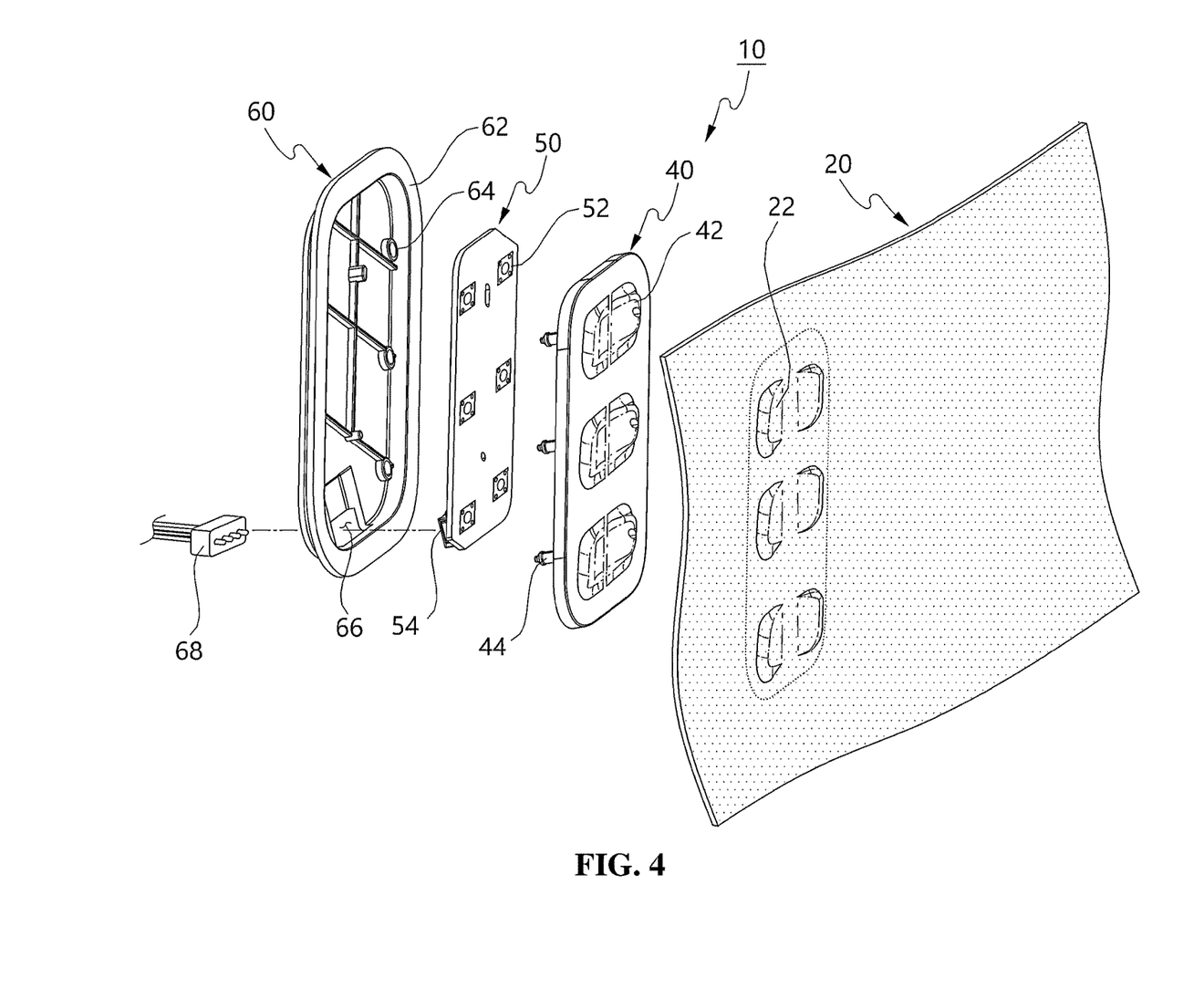
FIG. 4 is a diagram illustrating the disassembled operation button assembly together with the surface material in the operation button installation structure according to the exemplary embodiment of the present invention.
Figure 5:
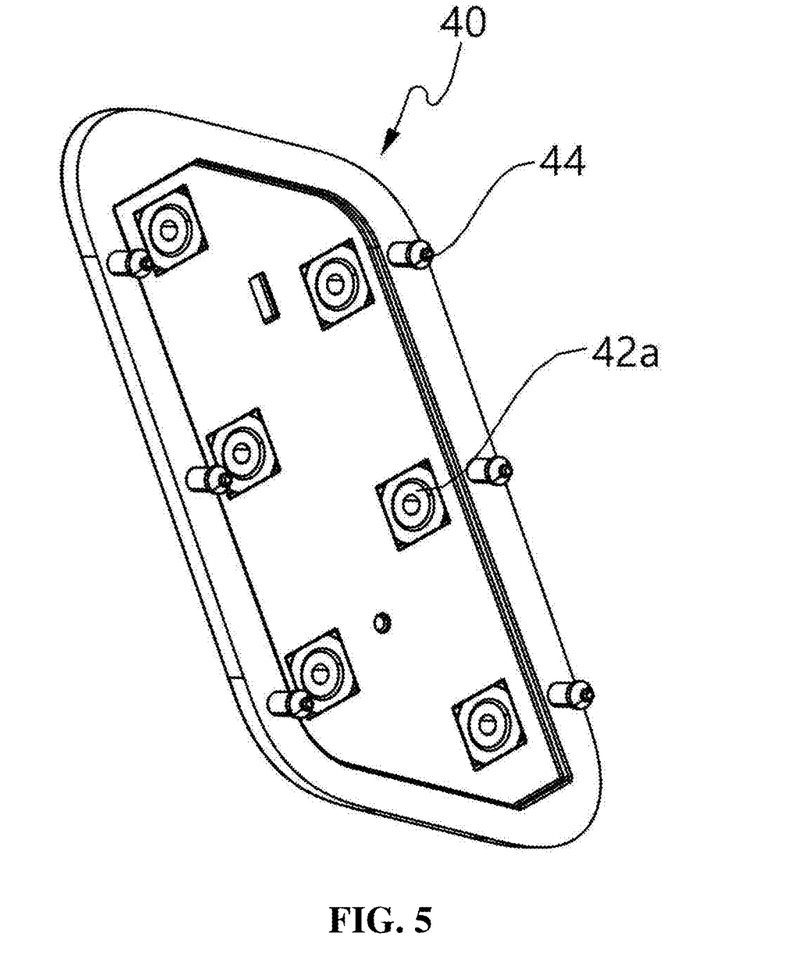
FIG. 5 is a diagram illustrating a cover part of the operation button assembly in the operation button installation structure according to the exemplary embodiment of the present invention viewed from the inside.
Figure 6:
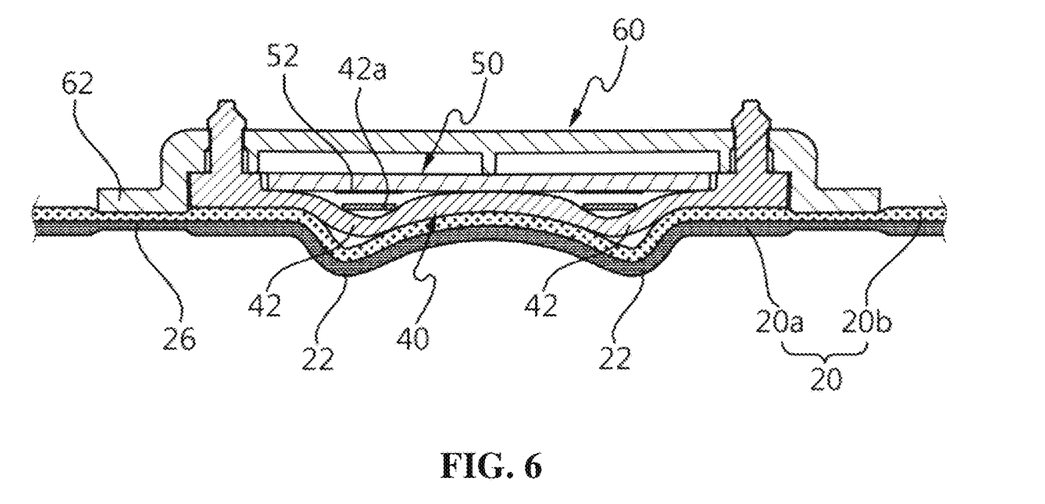
FIG. 6 is a cross-sectional view taken along line A-A' in FIG. 2B.

FIG. 3 is a diagram illustrating the separation state of the surface material and the operation button assembly in the operation button installation structure according to the exemplary embodiment of the present invention, and FIG. 4 is a diagram illustrating the disassembled operation button assembly together with the surface material in the operation button installation structure according to the exemplary embodiment of the present invention. Further, FIG. 5 is a diagram illustrating a cover part of the operation button assembly in the operation button installation structure according to the exemplary embodiment of the present invention viewed from the inside, and FIG. 6 is a cross-sectional view taken along line A-A' in FIG. 2B.

The installation configuration of the surface material 20 and the operation button assembly 30 and the configuration of the operation button assembly 30 will be described with reference to FIGS. 3 to 6.

The operation button assembly 30 is attached to the inner surface of the surface material 20. In the exemplary embodiment, the operation button assembly 30 includes a cover part 40, a control board 50, and a housing 60.

The cover part 40 is coupled to one side of the housing 60 to cover the opening surface of the housing 60. The cover part 40 includes a button 42, and referring to FIG. 5, a conductive contact part 42a is formed on an inner surface of the button 42. In the exemplary embodiment, the cover part 40 may be made of an elastic material, and for example, the cover part 40 may be formed of synthetic rubber, such as a silicone material or an Ethylene-Propylene Diene MONO-MER (EPDM). In one exemplary embodiment, the button 42 may protrude in response to the button operation unit 22 formed in the surface material 20. The button operation unit 22 is formed concave when viewed from the inner side of the surface material 20, and the button 42 may be molded to protrude in response to the concave portion of the button operation unit 22.

The cover part 40 may include a coupling protrusion 44 coupled to an installation recess 64 of the housing 60. By inserting the coupling protrusion 44 into the installation recess 64, the cover part 40 may be coupled to the housing 60.

The control board 50 has a switching terminal 52 with which the contact part 42a of the button 42 is in contact, and the contact part 42a is in contact with the switching terminal 52, so that a circuit is connected. When the button operation unit 22 of the surface material 20 is pressed, the button operation unit 22 is deformed and the button 42 is pressed, and the contact part 42a of the button 42 comes into contact with the switching terminal 52 and the switch is turned on. The control board 50 may be configured as a Printed Circuit Board (PCB), and a connector 54 for the connection with other electronic devices may be formed on one side of the control board 50.

The housing 60 accommodates the control board 50, and the control board 50 is seated on the housing 60 between the housing 60 and the cover part 40. An installation structure surface 62 is formed around the end of the housing 60. The installation structure surface 62 becomes a surface coupled to the surface material 20. On the other hand, a connector connection opening 66 may be formed on one side of the housing 60 toward the inside of the installation structure surface 62, and a cable 68 for connection with other electronic devices may be coupled to the connector 54 through the connector connection opening 66. The housing 60 may be made of a plastic material.

The operation button assembly 30 is integrated with the surface material 20 by coupling the installation structure surface 62 formed on the housing 60 to the inner surface of the surface material 20, that is, the assembly attachment part 26 in FIG. 2B. Accordingly, there is no need to provide a separate structure for supporting the operation button assembly 30.

In the exemplary embodiment, an adhesive may be applied to the installation structure surface 62 and the operation button assembly 30 may be coupled to the inner surface of the surface material 20. As another exemplary embodiment, the installation structure surface 62 and the assembly attachment part 26 of the surface material 20 may be coupled in a manner, such as ultrasonic fusion or thermal fusion.

Referring to FIG. 6, the surface material 20 may be provided in a form in which an outer material 20a and an inner material 20b are joined. As an example, the outer material 20a is natural leather or artificial leather, and the inner material 20b is a cushioning material for providing a cushion. The thickness of the inner material 20b as a cushioning material may be compressed by pressurization in a heated state, and the thickness of the outer material 20a may also be slightly reduced by pressurization.

According to the present invention, it is possible to remarkably reduce the inconvenience or the occurrence of defects in the operation as in the related art. Taking the vehicle seat 1 as an example, after the surface material 20 constituting the outer surface of the vehicle seat 1 is cut, the button operation unit 22 and the button display unit 24 are formed on the surface material 20, and the operation button assembly 30 is coupled to the inner surface of the surface material 20. After that, the surface material 20 to which the operation button assembly 30 is coupled is coupled to the vehicle seat 1. Accordingly, it is possible to solve the difficulty of installing an operation button, such as a walk-in switch. In addition, since only the surface material 20 constituting the vehicle seat 1 is exposed to the outside, the texture of the surface material 20 may be transmitted as it is, and the aesthetics and luxury of the vehicle seat 1 may be improved.

Next, an example of forming the button operation unit 22 in the surface material 20 will be described with reference to FIG. 7.

Figure 7:
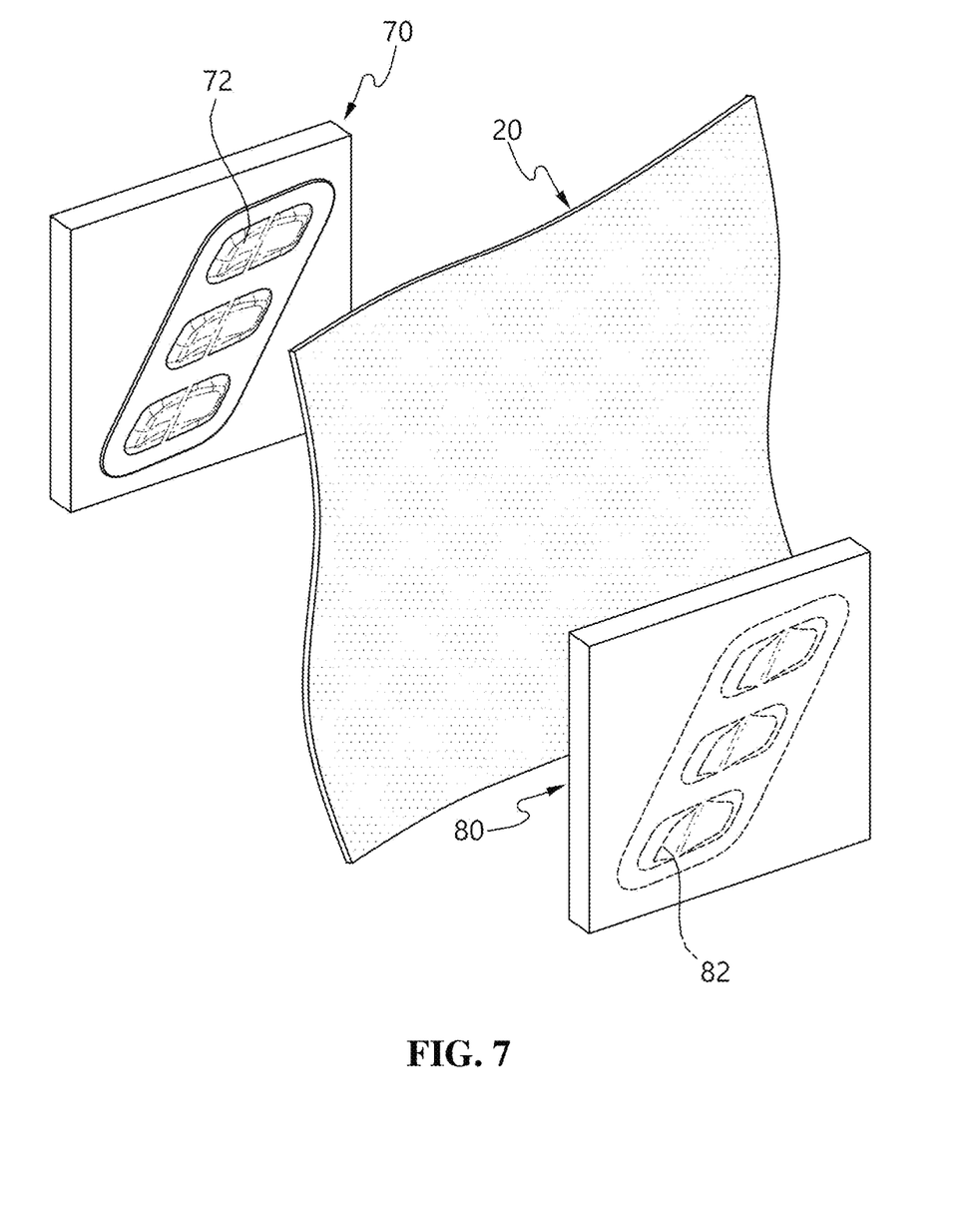
FIG. 7 is a diagram illustrating a process of processing the surface material in the operation button installation structure according to the exemplary embodiment of the present invention.

FIG. 7 is a diagram illustrating a process of processing the surface material in the operation button installation structure according to the exemplary embodiment of the present invention.

A protruding protrusion 72 is formed in a first mold 70 to form the button operation unit 22 on the surface material 20, and a concave portion 82 corresponding to the protrusion 72 is formed in a second mold 80. In a state where the surface material 20 is positioned between the first mold 70 and the second mold 80, the first mold 70 and the second mold 80 are brought into close contact with the inner surface and the outer surface of the surface material 20 to form the button operation unit 22 in the surface material 20. In the exemplary embodiment, the first mold 70 and the second mold 80 may pressurize the surface material with a predetermined pressure. In addition, the first mold 70 and the second mold 80 may be possible to pressurize the surface material while the first mold 70 and the second mold 80 are heated to a predetermined temperature.

Figure 8:
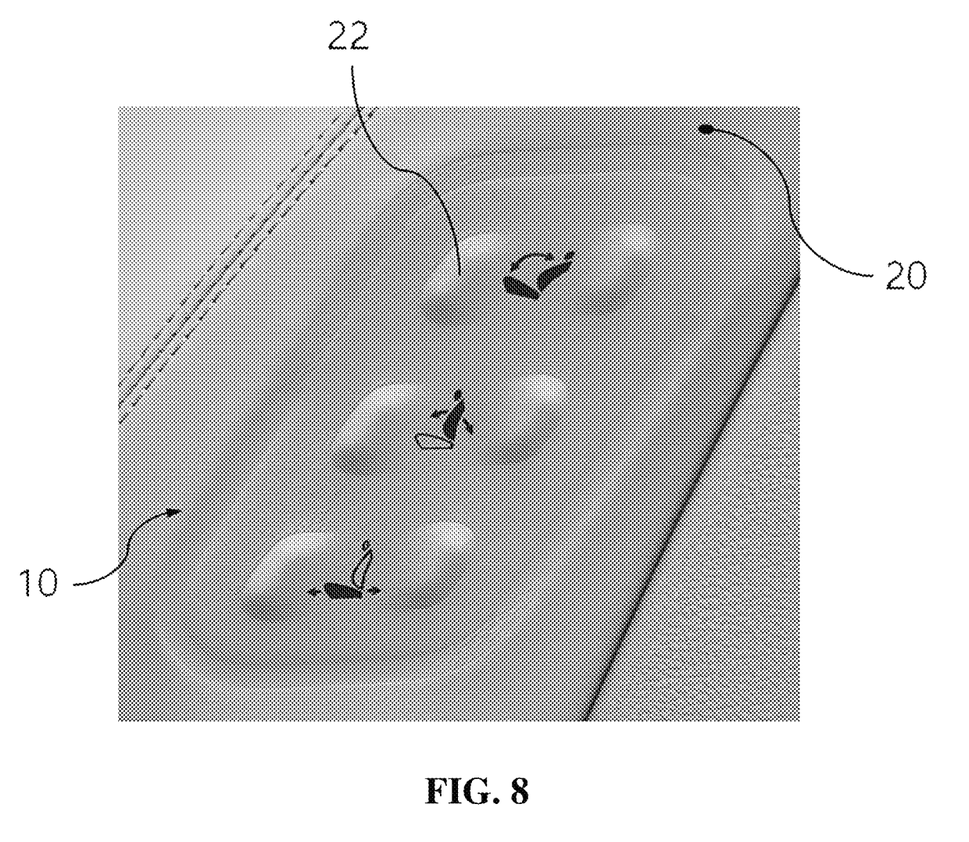
FIG. 8 is a diagram illustrating an example of the operation button installation structure to which the present invention is applied.
Figure 9:
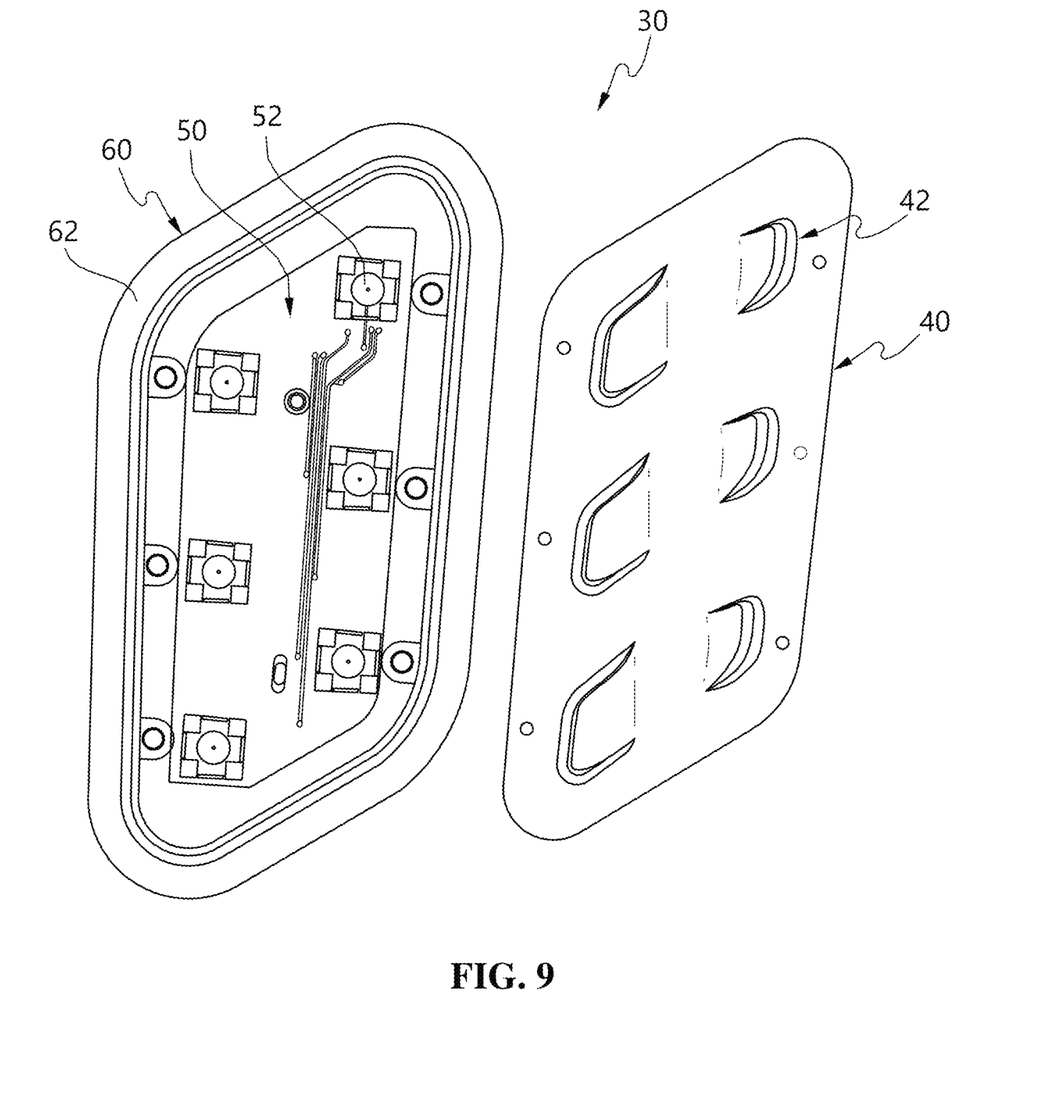
FIG. 9 is a diagram illustrating an example of the operation button assembly included in the operation button installation structure to which the present invention is applied.

FIG. 8 is a diagram illustrating an example of the operation button installation structure to which the present invention is applied, and FIG. 9 is a diagram illustrating an example of the operation button assembly included in the operation button installation structure to which the present invention is applied.

Referring to FIG. 8, it is illustrated that natural leather is used as the surface material 20, and the button operation unit 22 is formed on the surface. Referring to FIG. 9, it is illustrated that the cover part 40 provided with the button part 42 is formed of silicon, and the control board 50 provided with the switching terminal 52 is installed in the housing 60. According to the application of the present invention, there is no need to cut the natural leather in order to provide the operation button, so the appearance is more luxurious and the aesthetics is improved. On the other hand, the button part 42 of the cover part 40 having elasticity is capable of supporting restoration after the button operation unit 22 of the surface material 20 is pressed, thereby helping to maintain the appearance of the button operation unit 22.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A structure for installing an operation button in a vehicle seat, the structure comprising:
   a surface material covering the vehicle seat, wherein a button operation unit is formed on a portion of the surface material by deforming a shape of the portion of the surface material; and
   an operation button assembly attached to a back surface of the surface material and including the operation button corresponding to the button operation unit,
   wherein the button operation unit includes a button display unit configured for displaying a function of the button operation unit and formed on an outer side of the button operation unit on the portion of the surface material,
   wherein the operation button assembly includes:
   a cover part including the operation button corresponding to the button operation unit;
   a housing to which the cover part is coupled; and
   a control board provided between the housing and the cover part and including a switching terminal that is in contact with the operation button,
   wherein the cover part has a coupling protrusion formed to protrude, and the coupling protrusion is coupled to an installation recess formed in the housing, so that the cover part is coupled to the housing.

2. The structure of claim 1, wherein the button operation unit is molded to protrude to an outside of the surface material.

3. The structure of claim 2, wherein the button operation unit is molded by heating and pressurizing.

4. The structure of claim 1, wherein the button display unit is formed by at least one of printing, laser engraving, engraving, and embossing.

5. The structure of claim 1, wherein the operation button protrudes.

6. The structure of claim 1, wherein the cover part is formed of silicone or synthetic rubber.

7. The structure of claim 1, wherein an installation surface is formed around an end of the housing, and the installation surface is coupled to an inner surface of the surface material.

8. The structure of claim 7, wherein the installation surface is coupled to the inner surface of the surface material by at least one of an adhesive, thermal fusion, and ultrasonic fusion.

9. The structure of claim 1, wherein the housing includes a connector connection opening through which a cable connected to a connector of the control board passes.

10. A vehicle seat including the structure for installing the operation button of claim 1.

11. The structure of claim 1, wherein the surface material includes an outer material of natural leather, artificial leather, or synthetic resin, and an inner material as a cushioning material formed on an inner surface of the outer material.

12. A structure for installing an operation button in a vehicle seat, the structure comprising:
   a surface material covering the vehicle seat, wherein a button operation unit is formed on a portion of the surface material by deforming a shape of the portion of the surface material; and
   an operation button assembly attached to a back surface of the surface material and including the operation button corresponding to the button operation unit,
   wherein the button operation unit includes a button display unit configured for displaying a function of the button operation unit and formed on an outer side of the button operation unit on the portion of the surface material,
   wherein the operation button assembly includes:
   a cover part including the operation button corresponding to the button operation unit;
   a housing to which the cover part is coupled; and
   a control board provided between the housing and the cover part and including a switching terminal that is in contact with the operation button,
   wherein the housing includes a connector connection opening through which a cable connected to a connector of the control board passes.

13. The structure of claim 12, wherein the surface material includes an outer material of natural leather, artificial leather, or synthetic resin, and an inner material as a cushioning material formed on an inner surface of the outer material.

14. A vehicle seat including the structure for installing the operation button of claim 12.

* * * * *